United States Patent [19]

Medici et al.

[11] Patent Number: 4,677,270
[45] Date of Patent: Jun. 30, 1987

[54] SPARK EROSION MACHINE WITH COUPLED WIRE ELECTRODE GUIDANCE HEADS

[75] Inventors: Brenno Medici, Peccia; Attilio Lodetti, Losone, both of Switzerland

[73] Assignee: AG fur industrielle Elektronik AGIE, Losone/Locarno, Switzerland

[21] Appl. No.: 843,361

[22] Filed: Mar. 21, 1986

[30] Foreign Application Priority Data

Apr. 1, 1985 [DE] Fed. Rep. of Germany ....... 3511929

[51] Int. Cl.$^4$ ............................................. B23H 7/10
[52] U.S. Cl. .................................. 219/69 W; 204/206; 226/199
[58] Field of Search .................. 219/69 G, 69 W, 68, 219/69 R; 226/199; 204/206, 224 M

[56] References Cited

U.S. PATENT DOCUMENTS

| 3,588,196 | 6/1971 | Bonga et al. | 219/69 G |
| 3,731,044 | 5/1973 | Ullmann et al. | 219/69 W |
| 3,849,624 | 11/1974 | Dulebohn et al. | 219/69 W |
| 3,946,189 | 3/1976 | Pomella et al. | 219/69 W |
| 4,431,896 | 2/1984 | Lodetti | 219/69 W |
| 4,485,288 | 11/1984 | Schneider | 219/69 E |
| 4,547,646 | 10/1985 | Briffod | 219/69 W |
| 4,596,640 | 6/1986 | Inoue | 219/69 W |

FOREIGN PATENT DOCUMENTS 3201544 7/1983 Fed. Rep. of Germany .
52-28094 3/1977 Japan ................................. 226/199

OTHER PUBLICATIONS

"Fail-Safe Electrical Discharge Machine", *IBM Technical Disclose Bulletin*, vol. 17, No. 11, Apr. 1975 by Iwata et al.

Primary Examiner—A. D. Pellinen
Assistant Examiner—Geoffrey S. Evans
Attorney, Agent, or Firm—Neuman, Williams Anderson & Olson

[57] ABSTRACT

A spark erosion machine having two spaced apart wire electrode guidance heads, which are forcibly coupled with one another in such a way that the guidance heads are always coaxial to one another. The forced coupling takes place by a hydraulic system that includes adjusting cylinders for the guidance heads and associated control cylinders. The piston rods of the adjusting cylinders are coupled to one another. By the use of hydraulic circuits, a displacement of the piston rods of the control cylinders leads to a corresponding displacement of the piston rods of the associated adjusting cylinders, so that the orientation of both wire guidance heads is always the same. As a result of this hydraulic system, there is no need to couple the upper and lower wire guidance heads by a mechanical linkage, so that the working zone between the heads and the lateral area for the workpiece connected thereto can be of a random magnitude.

11 Claims, 2 Drawing Figures

SPARK EROSION MACHINE WITH COUPLED WIRE ELECTRODE GUIDANCE HEADS

BACKGROUND OF THE INVENTION

The present invention relates to a spark erosion machine having coaxially spaced, forcibly coupled, pivotable wire guidance heads for guiding a wire-type electrode in the erosion zone of the spark erosion machine.

Such a spark erosion machine is generally known from DE-OS No. 32 01 544. In order to make conical or other sloping cuts in wire erosion machines, the wire electrode must be inclined. In order to obtain a satisfactory entry and exit of the electrode with respect to the wire guidance heads, it is desirable to align the axes of the heads in line with the wire electrode guided between the heads. The wire guidance heads must therefore be coaxial to one another. To solve this problem, DE-OS No. 32 01 544 proposes to forcibly couple together the two wire guidance heads by means of a parallelogram linkage. A separate parallelogram linkage is associated with each wire guidance head, the two parallelogram linkages being connected by a common vertical spindle, which is also telescopically extendible. The spindle is positioned parallel to the wire electrode portion guided between the wire guidance heads and, through the operation of the two parallelogram linkages fixed thereto, achieves the coaxial alignment of the guidance heads.

It is a disadvantage of this arrangement that the vertical spindle can only have a limited spacing from the electrode, corresponding to the length of the parallelogram linkages. However, this limits the operating range of the spark erosion machine, so that it is unsuitable for larger workpieces. If the parallelogram linkage is made very large, it is subject to thermal expansion, dimensional inaccuracies and tolerances, so that the axial alignment of the wire guidance heads suffers.

SUMMARY OF THE INVENTION

These disadvantages are overcome by the present invention. The problem addressed by the invention is to so improve the spark erosion machine of the aforementioned type that a coaxial alignment of the two wire guidance heads is possible in a precise manner and with limited structural expenditure, without limiting the working range between the two guidance heads.

A basic principle of the invention is to replace a mechanical parallelogram linkage by a hydraulic, forcible coupling of the two wire guidance heads. This leads to a greater constructional freedom, because the necessary hydraulic cylinders have a relatively small size. Further, the control cylinders associated therewith can be placed at random points on the machine, because the hydraulic lines connecting the adjusting cylinders to the control cylinders can have a random length. According to a variant of the invention, the control cylinders are operated by means of electronically controlled adjusting motors, while according to another variant the adjustment of the control cylinders is brought about by the slide movement of the adjustment slide for the conical setting. In this variant, the invention leads to a mechanical and constructionally simple compensation, which takes account of the vertical spacing of the two wire guidance heads and corrects the angular swing thereof occurring during the slide movement in accordance with the vertical spacing.

BRIEF DESCRIPTION OF THE DRAWINGS

The invention is described in greater detail hereinafter relative to illustrative embodiments and the attached drawings, which show.

DETAILED DESCRIPTION OF THE PREFERRED EMBODIMENTS

Figure 1:
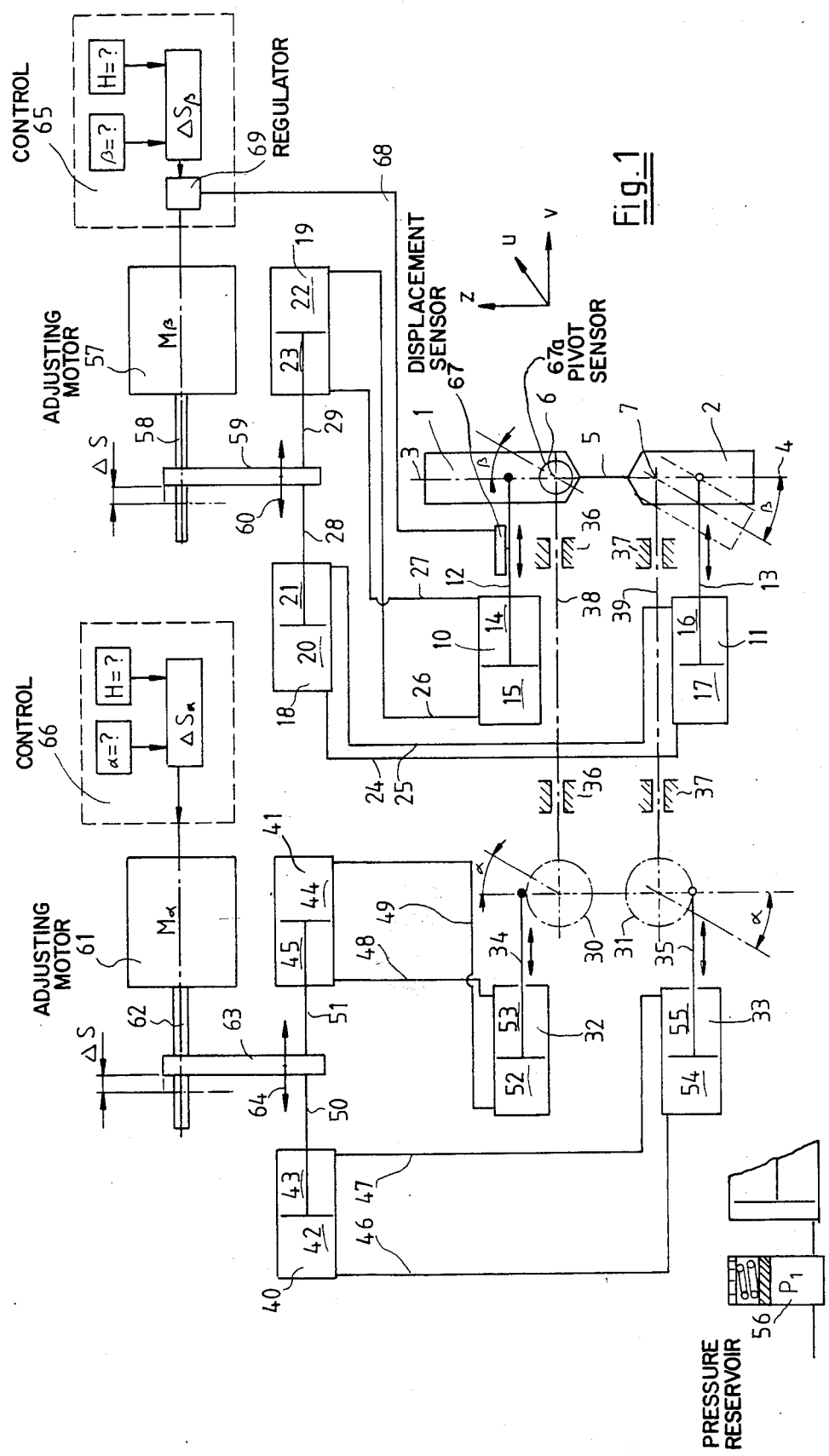
FIG. 1, a diagrammatic basic circuit diagram of a spark erosion machine according to the invention.

The same reference numerals in the individual drawings are used to indicate identical or corresponding parts.

The spark erosion machine has two spaced wire guidance heads, the upper head 1 and the lower head 2. The axis of the upper wire guidance heads 1 is designated 3 and that of the lower head 2 is designated 4. Between the facing tips of the wire guidance heads is located the operating or erosion zone of the spark erosion machine, through which passes a wire-type electrode 5. In order to obtain completely satisfactory erosion, it is desirable for there to be a coaxial alignment of axes 3 and 4, so that the axes 3, 4 and electrode 5 are located on a common line in the erosion zone, even in the case of a sloping alignment of the wire guidance heads such as is necessary for cutting a cone or taper, where the guidance heads are tilted with respect to the Z axis (vertical axis).

The wire guidance heads 1, 2 are mounted in pivot bearings 6, 7 and can be tilted or pivoted about two axes (U and V) in the bearings. Pivoting about the U axis consequently leads to a rotation of the heads by an angle $\beta$ in the plane fixed by axes Z and V. A pivoting of the heads about the V axis brings about a rotation of the heads by an angle $\alpha$ in the plane fixed by axes Z and U.

In order to obtain the aforementioned coaxial alignment of the two heads, naturally one of the heads, normally the upper head 1, must additionally be displaced in the plane fixed by the coordinates U and V, which takes place through slides 8, 9 of the machine displaceable in the V or U direction, respectively (coordinates U and V conventionally designate the adjustment coordinates of the tool, while coordinates X and Y designate the adjustment coordinates of the workpiece).

Thus, in the present embodiment, the upper wire guidance head 1 is displaceable in a translatory manner in the UV plane by slides 8 and 9 (FIG. 2), in addition to the possibility of pivoting by angles $\alpha$ and $\beta$, which determine the orientation of the wire guidance heads.

For pivoting the wire guidance heads 1, 2 about angle $\beta$, two adjusting cylinders 10, 11 are provided, which are fixed by piston rods 12, 13 to the associated wire guidance head 1 or 2, The articulation point of piston rods 12, 13 to the associated heads 1, 2 is displaced relative to the pivoting point defined by pivot bearing 6, 7 by a distance and specifically in a direction leading away from the working zone starting from the pivot bearings 6, 7.

The two adjusting cylinders 10, 11 in each case have chambers 14, 15 and 16, 17 separated by the displaceable pistons. The two adjusting cylinders 10, 11 are forcibly coupled with one another in such a way that they are always pivoted in the same sense and by the same amount (e.g., angle $\beta$). For this purpose two control cylinders 18, 19 are provided, control cylinder 18 adjusting the lower wire guidance head 2 and control cylinder 19 adjusting the upper wire guidance head 1. Both control cylinders 18, 19 have in each case two chambers 20, 21 and 22, 23 separated by a displaceable piston. Chamber 20 is connected by a line 24 to chamber 17, and chamber 21 is connected by a line 25 to chamber 16. In the same way chamber 22 is connected by a line 26 to chamber 15, and chamber 23 is connected by a line 27 to chamber 14. Adjusting cylinders 10, 11 and control cylinders 18, 19 have substantially the same construction, so as to obtain synchronism. In order to complete the aforementioned forcible coupling, the piston rods 28, 29 of control cylinders 18 and 19 are connected together. Thus, if for example piston rod 28 is moved to the right, then also the piston rod 29 is moved to the right. Thus, chamber 21 is made smaller and the fluid, such as hydraulic oil located therein, is correspondingly pressed into chamber 16, which therefore undergoes a size increase. The size of chamber 17 is reduced as a result and presses the hydraulic oil therein into the corresponding chamber 20 which increases in size. Thus, the lower wire guidance head 2 is pivoted clockwise by an angle $\beta$ in the drawing plane of FIG. 1. As a result of the fixed arrangement of piston rods 28, 29, chamber 22 is made smaller and chamber 23 correspondingly larger. Thus, the piston and piston rod 12 of adjusting cylinder 10 are forced to the right (chamber 15 made larger and chamber 14 made smaller) and specifically to the same extent as the piston and piston rod 13 of adjusting cylinder 11 are moved to the left. Thus, the upper wire guidance head 1 is pivoted clockwise by the same angle $\beta$ in the drawing plane of FIG. 1. Thus, both heads 1, 2 have the same orientation, but although their axes are parallel to one another they are not coaxial, because the pivoting points of pivot bearing 6, 7 are spaced apart in the Z-direction. In order to obtain the coaxial alignment after pivoting the heads by an angle $\beta$ it is necessary, as indicated by the wire guidance head 1 shown in broken line form in FIG. 2, that the upper wire guidance head 1 must be moved in a relative translatory manner by an amount $\Delta$ V in the V direction, which takes place by means of the slide 8. It is obvious that the adjusting cylinder 10 must be moved by the same amount. Thus, it is sufficient if the adjusting cylinder 10 is fixed to the slide 8 and consequently performs the same translatory movement as the upper wire guidance head 1.

The pivoting of wire guidance heads 1, 2 in the same direction about the angle $\alpha$ located in the ZU plane takes place in the same way by means of hydraulic, forcibly coupled adjusting cylinders 32, 33 and corresponding control cylinders 40, 41 associated therewith. In the represented embodiment the conversion of the translatory movement of piston rods 34, 35 of adjusting cylinders 32, 33 takes place by means of converters of a linear movement into a rotary movement, constituted by crank gears 30, 31. For this purpose, the two piston rods 34, 35 are fixed in an articulated eccentric manner to crank discs, the central axes of the discs being connected to drive shafts 38, 39, whose other ends are connected to the wire guidance heads 1, 2 in pivot bearing 6, 7. Shafts 38, 39 are mounted in an appropriate manner, as indicated by bearings 36, 37. Since, on pivoting the heads about an angle $\alpha$, a translatory displacement of the upper wire guidance head 1 in direction U is also necessary for obtaining the coaxial alignment, the head 1, crank gear 30 and adjusting cylinder 32 are displaceable together with the slide U.

Otherwise, there is a corresponding construction and operation of the adjusting cylinders 32, 33 and their control cylinders 40, 41 on the one hand and the adjusting cylinders 10, 11 and the associated control cylinders 18, 19 on the other. The chamber 52 of the adjusting cylinder 32 is connected by a line 49 to the chamber 44 of the control cylinder 41. The other chamber 53 of the adjusting cylinder 32 is connected by a line 48 to the other chamber 45 of the control cylinder 41. The chamber 54 of the adjusting cylinder 33 is connected by a line 46 to the chamber 42 of the control cylinder 40, while the other chamber 55 of the adjusting cylinder 33 is connected by a line 47 to the other chamber 43 of the control cylinder 40.

The two piston rods 50, 51 of the control cylinders 40, 41 are firmly coupled together, so that they can only be moved together in the same direction.

To be able to maintain a constant pressure in the complete hydraulic system and compensate possible leakage losses, a pressure reservoir 56, such as a spring-loaded reservoir, is provided in each circuit. Such a pressure reservoir 56 can be interposed in each of the lines 24, 25, 26, 27, 46, 47, 48, 49 for a complete pressure compensation.

In the embodiment according to FIG. 1, there is an electromotive adjustment of control cylinders 18, 19 or 40, 41. A first adjusting motor 57 for the angle $\beta$, on rotating its shaft 58, such as by a spindle drive, displaces a sliding member 59 linearly in the direction of arrow 60, so that the piston rods 28, 29, which are both connected to the sliding member 59, are displaced by the same amount $\Delta$ S. In the same way, a second adjusting motor 61 is provided for adjusting the angle $\alpha$, and its shaft 62 moves a sliding member 63 linearly in the direction of arrow 64 by an amount $\Delta$ S, sliding member 63 being connected to piston rods 50, 51.

With each of the two adjusting motors 57, 61 is associated a control means 65, 66, which by means of externally supplied values (e.g., by means of a keyboard or a digital machine control system) relating to the angles $\alpha$ and $\beta$, as well as the height of cut H, calculate the necessary values for the displacement of sliding members 59, 63, i.e. the values $\Delta$ S$\beta$ and $\Delta$ S$\alpha$, and drive the adjusting motors 57, 61 as a function of the determined values. Thus, these motors can be stepping motors for example.

A closed control loop can additionally be provided, as shown for the adjustment of the angle $\beta$ on the upper wire guidance head 1. A sensor 67 measures the displacement of piston rod 12 and therefore the angle $\beta$ and supplies this information by an electric control line 68 to a regulator 69, which produces from the measured signal and the nominal value signal $\Delta$ S$\beta$ a control signal for motor 57. In the same way a control loop can also be formed for the angle $\alpha$, in that the pivoting of the wire guidance head 1 by angle $\alpha$ is measured with a sensor 67a, which is located in pivot bearing 6. The measured signal for angle $\alpha$ can be used in a corresponding manner for regulation purposes in the control means 66.

Figure 2:
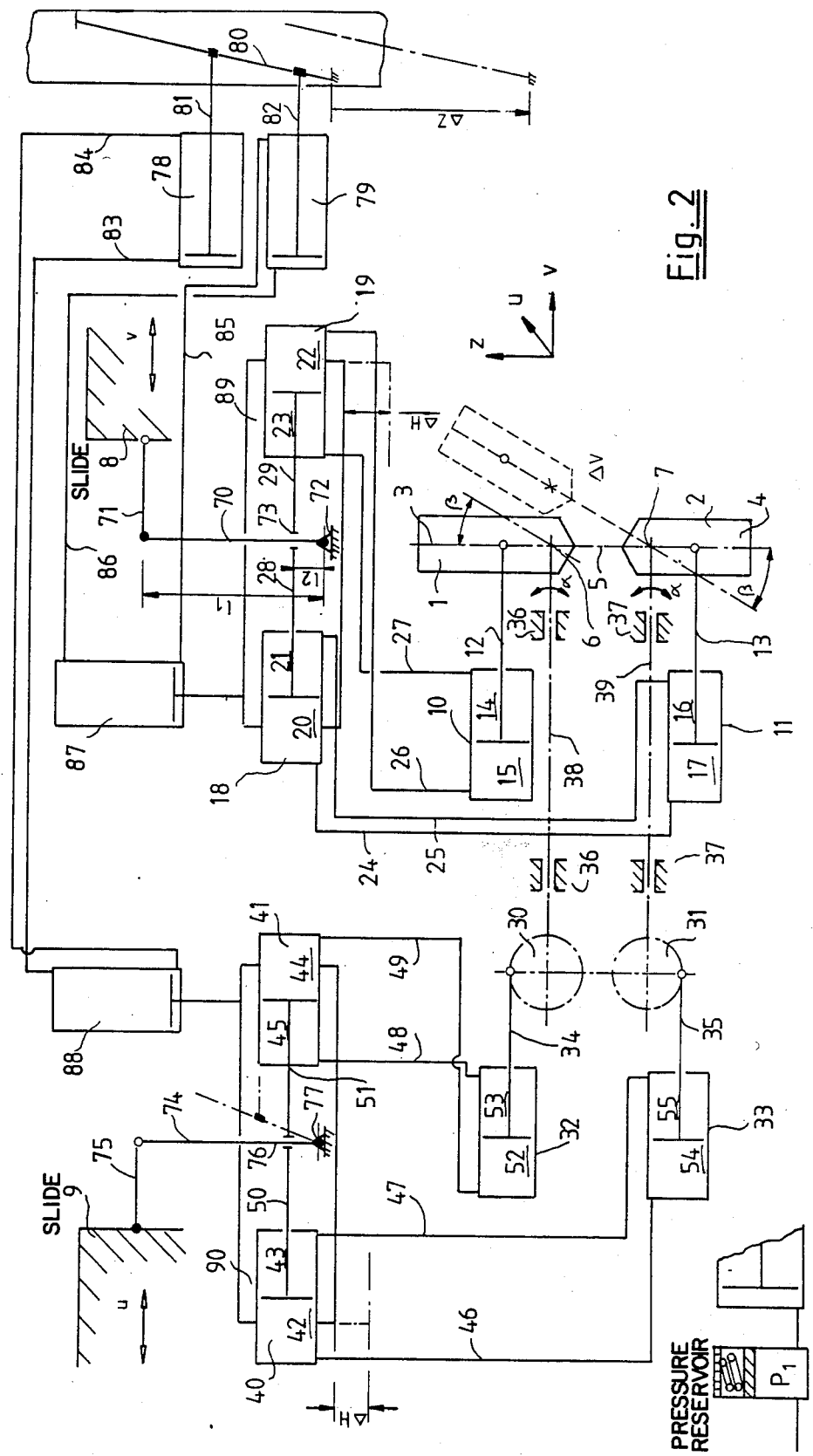
FIG. 2, a similar basic circuit diagram according to a further development of the invention.

FIG. 2 shows a further development of the invention which has a mechanical basis, meaning that in place of adjusting motors 57, 61, piston rods 28, 29 and 50, 51 of the adjusting cylinders are operated by means of a lever linkage coupled to the V or U slide 8, 9. For this purpose a lever linkage is fixed to slide 8 and comprises two lever rods 70, 71 coupled to one another in an articulated manner. The free end of rod 71 is coupled to slide 8, while the free end of lever rod 70 is held in an articulated manner in a fixed bearing 72. The common connection point of piston rods 28, 29 is at the lever rod 70, e.g., by means of a bush or sleeve 73, to which are fixed the piston rods 28, 29 and through which is passed the lever rod 70. Bush 73 is at a distance $l_2$ from the pivot point of bearing 72. Lever rod 70 has a total length of $l_1$. If slide 8 is now moved, the piston rods 28, 29 are also moved corresponding to the lever transmission ratio $l_2/l_1$, so that the pivoting of the wire guidance heads is by angle $\beta$.

Correspondingly, slide 9 is designed for the displacement of piston rods 50, 51 by means of a lever linkage comprising rods 74, 75, a bush 76 and a fixed bearing 77. Thus, a displacement of slide 9 leads to a pivoting movement of wire guidance heads 1, 2 by an angle $\alpha$.

As the pivoting angle is here modified by the displacement of the U and V-slide, it is pointed out that the connection between the slide adjustment in the U and V-directions and the pivoting of the wire guidance heads by angles $\alpha$ and $\beta$ are also dependent on the height of the cut, i.e. the distance in the Z-direction between the two heads 1, 2. For determining the influence of the height of cut, a compensating system is provided, which is constructed in the following way. Two control cylinders 78, 79 are connected to a compensating rod 80 and specifically by means of their piston rods 81, 82, whose free ends can slide by means of sleeves along the compensating rod 80. The compensating rod slopes by a given angle with respect to the Z-axis. In each case the two chambers of control cylinders 78, 79 are connected by lines 83, 84 or 85, 86 to corresponding chambers of the compensating cylinders 87, 88. The compensating cylinders 87, 88 displace, by means of their piston rods, frames 89, 90, on which are held the control cylinders 18, 19 and 40, 41 and namely by an amount $\Delta H$ in the case of a Z-displacement of the wire guidance heads 1, 2 by an amount $\Delta Z$. As a result of this displacement of the control cylinders 18, 19 and 40, 41, the lever transmission ratios of lever rods 70, 74 are modified and consequently the adjustment path of control cylinders 18, 19 and 40, 41 is adapted to the height of the cut. The two control cylinders 78, 79 can be moved in the Z-direction together with the upper wire guidance head 1, whereas the compensating rod 80 is fixed. Conversely, in the case of fixed control cylinders 78, 79, the compensating rod 80 can be adjusted in the Z-direction together with the upper wire guidance head 1.

Details of the invention as described herein relative to the preferred embodiments can be utilized alone or in combination in accordance with the invention. Further improvements and modifications of the present invention are also possible and are intended to be encompassed with in the true scope of the invention.

What is claimed is:

1. A spark erosion machine using a wire-like tool electrode and including two spaced apart, coupled wire guidance heads for guiding the tool electrode in an erosion zone between the guidance heads, wherein each wire guidance head is pivotable in at least one plane about a pivot point for that plane; a hydraulic pivot drive means associated with each guidance head for each plane of pivot for pivoting the guidance head in the pivot plane; and a hydraulic control means connected to each of the two pivot drive means for each plane of pivot for setting, in synchronism, the pivot of each guidance head while maintaining the axes of the wire guidance heads substantially parallel.

2. A spark erosion machine using a wire-like tool electrode and including two forcibly coupled, pivotable wire guidance heads which are spaced from one another for guiding the electrode therebetween, wherein for each pivot plane of a wire guidance head there is provided a hydraulic adjusting cylinder, whose piston rod is operatively connected to its associated wire guidance head for pivoting the wire guidance head in the pivot plane; each adjusting cylinder is hydraulically connected to an associated control cylinder in such a way that a displacement of the control cylinder piston leads to a corresponding displacement of the piston of the associated adjusting cylinder; and the control cylinders associated with the adjusting cylinders for the two wire guidance heads in each pivot plane are interconnected by their piston rods, the latter being controllably displaceable to effect a pivot of the wire guidance heads while maintaining the guidance heads substantially parallel.

3. A spark erosion machine according to claim 2, wherein the displacement of the piston rods of the control cylinders for each pivot plane takes place by electronically controlled adjusting motors.

4. A spark erosion machine according to claim 2, wherein the adjustment of the piston rods of the control cylinders for each pivot plane takes place by a lever linkage, the lever linkage being coupled to a tool slide of the spark erosion machine.

5. A spark erosion machine according to claim 2, wherein one of the wire guidance heads is additionally displaceable in translatory manner by the tool slides of the spark erosion machine in consideration of the pivoting of the guidance heads, so that the axes of the wire guidance heads are maintained coaxial with one another.

6. A spark erosion machine according to claim 5, wherein the adjusting cylinders are displaceable together with the associated wire guidance head in a translatory manner by the tool slides of the spark erosion machine.

7. A spark erosion machine according to claim 3, further comprising measuring means for measuring the pivoting angle of at least one of the wire guidance heads, and regulating means connected to the output of the measuring means for controlling the adjusting motors to effect a desired pivot of the guidance heads in consideration of the measured pivoting angle.

8. A spark erosion machine according to claim 4, wherein a compensation system is further provided for adjusting the effective lever transmission ratio of the lever linkage as a function of the vertical spacing of the two wire guidance heads.

9. A spark erosion machine according to claim 8, wherein the compensation system includes a sloping compensating rod, on which are slidably guided the piston rods of further control cylinders; the further control cylinders being hydraulically connected to compensating cylinders, which are adapted to modify the lever transmission ratio of the lever linkage; and wherein the two further control cylinders are displaceable in the Z-direction relative to the compensating rod as a function of the vertical spacing of the two wire guidance heads.

10. A spark erosion machine according to claim 9, wherein the compensating cylinders are fixed with respect to its associated lever linkage and the piston rods of the compensating cylinders are fixed to the control cylinders for the guidance head adjusting cylinders.

11. A spark erosion machine according to claim 2 wherein a pressure reservoir is connected in each hydraulic circuit to maintain a constant pressure therein.

* * * * *